United States Patent [19]  
Newberry

[11] 4,205,034  
[45] May 27, 1980

[54] METHOD FOR MAKING A REINFORCED TUBULAR ARTICLE

[75] Inventor: Mark A. Newberry, Lakewood, Colo.

[73] Assignee: The Gates Rubber Company, Denver, Colo.

[21] Appl. No.: 822,591

[22] Filed: Aug. 8, 1977

Related U.S. Application Data

[62] Division of Ser. No. 583,068, Jun. 2, 1975.

[51] Int. Cl.² .......................... B29H 7/14; B29C 17/02; B29D 23/05
[52] U.S. Cl. .................................. 264/103; 156/165; 156/244.24; 156/294; 264/173; 264/209; 264/210.1; 264/248; 264/250; 264/255; 264/257; 264/339; 264/347
[58] Field of Search ................. 264/236, 347, 255, 93, 264/295, 94, 250, 173, 210 R, 339, 314, DIG. 52, 336, 46.9, 320, 46.7, 285, 90, 92, 97, 98, 100, 267, 209, 326, 210, 150, 103, 148, 257; 156/173, 187, 182, 149, 212, 213, 303.1, 294, 165, 244.24; 428/36; 138/121-126, 137, 141, 153, 134, 172, 177, 99, 109, 110

[56] References Cited

U.S. PATENT DOCUMENTS

| 1,665,309 | 4/1928 | Laursen | 264/347 |
| 1,682,124 | 8/1928 | Hennessy | 264/347 |
| 2,027,962 | 1/1936 | Currie | 156/294 |
| 2,622,657 | 12/1952 | Klaue | 156/294 |
| 2,783,819 | 3/1957 | Duff | 264/93 |
| 2,788,804 | 4/1957 | Larkin | 138/125 |
| 2,897,839 | 8/1959 | Roberts et al. | 138/122 |
| 2,897,840 | 8/1959 | Roberts et al. | 264/94 |
| 3,028,290 | 4/1962 | Roberts et al. | 138/122 |
| 3,037,798 | 6/1962 | Cooper | 264/DIG. 52 |
| 3,222,728 | 12/1965 | Roberts et al. | 264/94 |
| 3,262,625 | 7/1966 | Russell et al. | 264/45.6 |
| 3,379,805 | 4/1968 | Roberts | 264/94 |
| 3,682,202 | 8/1972 | Buhrmann | 138/126 |
| 3,725,167 | 4/1973 | Love et al. | 156/148 |

FOREIGN PATENT DOCUMENTS 10796 of 1896 United Kingdom ..................... 156/294  
437396 10/1935 United Kingdom ..................... 156/143

OTHER PUBLICATIONS

Alliger et al., Vulcanization of Elastomers, Reinhold, N.Y., (1964) pp. 77-79.

Primary Examiner—W. E. Hoag  
Attorney, Agent, or Firm—Curtis H. Castleman, Jr.; Raymond Fink; H. W. Oberg, Jr.

[57] ABSTRACT

A flexible preferably tubular article is described having an outer abrasion-resistant protective sleeve which is cured-in-place on a flexible core or tube to form a unitary flexible composite.

10 Claims, 2 Drawing Figures

METHOD FOR MAKING A REINFORCED TUBULAR ARTICLE

This is a division of application Ser. No. 583,068, filed June 2, 1975.

BACKGROUND OF THE INVENTION

This invention relates particularly to tubular flexible articles, such as hose, carrying a sleeve over a portion of the tube for protection against abrasive or chemical or other environmental influences.

Various tubular elastomeric products such as hose or other tubing, or flexible cores carrying a sheath of elastomeric material, are subjected to localized environmental hazards, such as abrasion, due to insufficient clearances with machine parts, heat sources, chemical influences, proximity to batteries, etc. Normally the small area of the tubular article affected does not warrant the use of a protective covering other than over the specifically affected area.

In the past, localized protection has been usually provided by provision of a slip-on sleeve or a brace connected to a nearby support to hold the tubular product away from the hazard. The slip-on sleeves have been applied either (1) loosely upon the tubular core, (2) have been clamped on by separate retention means such as hose clamps, or (3) have been joined to the base tube with the aid of an adhesive cement. In each of the above instances, and particularly in the first and third instances, relative slippage between the protective sleeve and core substrate has been prevalent; in the case where cement or adhesive is used to bond the elements securely together, it has been found that the cement has the tendency to become brittle and the mutual bond broken as a result of vibration and volatilization of adhesive components, such as solvents or tackifiers.

It is a primary object of the subject invention to provide a unitary, composite article in which the protective sleeve becomes a permanent, integral portion of the product, not subject to slippage, and which does not require the use of additional means, such as clamps or cement, to maintain the unitary and integral characteristic of the composite article.

SUMMARY OF THE INVENTION

Briefly described, in one aspect the flexible composite article of the invention includes an elongated flexible core having at least its outer surface formed of heat setting elastomeric material, and a protective heat setting cured-in-place elastomeric sleeve, of lesser length than the core and disposed intermediate the ends thereof, enveloping at least a portion of the core and intimately bonded to the outer surface of the core either by self-adherence or with the aid of a tie gum of heat setting elastomeric material, to form the unitary article.

In another aspect, the above described composite article is made according to the steps of (1) forming an elongated core member having an outer surface comprised of heat setting elastomeric material in at least a partially uncured state; (2) applying a heat setting elastomeric sleeve or layer of heat setting elastomeric material in at least a partially uncured state over a portion of the length of the core and enshrouding at least a portion of the core member, and (3) co-curing the core member and the attached sleeve in a manner such that the core and sleeve become intimately bonded along their joining surfaces.

BRIEF DESCRIPTION OF THE DRAWINGS

Certain preferred embodiments of the invention will be described in conjunction with the following drawings, where like numerals designate like parts, and in which.

PREFERRED EMBODIMENTS OF THE INVENTION

Figure 1:
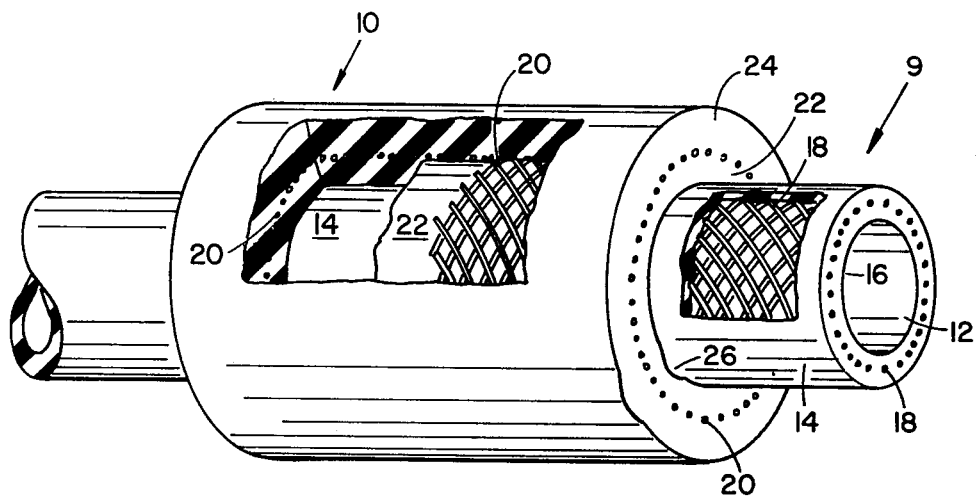
FIG. 1 is a partial cutaway view of the composite article of the invention in one of its forms.

Referring to FIG. 1, the composite article of the invention generally includes an elongated flexible core 9 partially enshrouded by a protective sleeve generally shown at 10. The flexible core 9, which may be of any indeterminate length, may be tubular and preferably cylindrical in shape such as a hose segment having an internal passageway 12 for conveying fluids. Any type of conventional flexible core is suitable in this respect provided that it be flexible and have an outer surface or cover 14 comprised of heat setting elastomeric character having a degree of resilience.

In the embodiment of FIG. 1, the flexible core 9 includes an inner tubular member 16, a reinforcement 18 twined or otherwise positioned over the inner tube, and the outer cover 14. Normally the reinforcement will be fully embedded within the hose body. The reinforcement may typically be woven, or twined about the inner tube in the form of a knit, braid or spiral, for instance, and multiple plies may be utilized. Typical reinforcement materials include textiles and wire in the form of filaments, twisted strands and the like, as desired. Discrete dispersed fiber loading may alternatively serve as the reinforcement.

Typical elastomeric materials which may be used in the flexible core body include heat setting, preferably natural and synthetic rubbers, exemplified by SBR, neoprene and ethylene propylene diene monomer (EPDM). These preferred rubbers may be blended with elastomeric thermoplastics and thermosets such as urethanes, polyvinylchloride, polyesters, silicones and polypropylene, for instance. By "heat setting" is meant that the material flows in a plastic state upon application of heat, and then sets upon cooling, preferably taking a final thermoset (e.g., cross-linked) configuration.

The protective sleeve 10, like the flexible core may contain a reinforcement 20, shown as two plies of oppositely helically spiralled members, embedded within a matrix body including an elastomeric tubular core 22 and optionally a cover 24 enveloping and protecting the reinforcement plies. The overall protective sleeve is shorter than the length of the tubular core, and will be intimately affixed or bonded to the core at the location intermediate the ends where protection against environmental hazard is needed. It is preferred that the protective sleeve completely encircle and enshroud the flexible core, although only partial circumferential encirclement is necessary so long as the area of the flexible core requiring protection is covered and the sleeve or core are so intimately attached that no mutual slippage or severence one from the other is possible.

Although it is preferred that the inner surface 22 of the protective sleeve be in intimate bonding contact with the outer cover 14 of the base core along their entire mutual interface or contact areas, it is generally only required that there be sufficient contact and mutual adhering attachment between the base core and outer tube, either by chemical bonding (e.g., cross linking of the rubber materials), fusing or other type of self-adherence. There may be in certain instances minor surface area portions along the mutual interface which may not be fully attached. For instance, in one of the methods which will be described hereafter for producing the composite article, utilizing an open steam cure a portion of the extreme longitudinal edges of the sleeve, such as the puckered portion 26 may not be in adherence to the core outer surface 14. However, interior portions of the sleeve intermediate its longitudinal extremities, shown for instance in the cutout portion of FIG. 1, will be substantially fully adhered to the core so that a permanent integral hose composite will be provided in which the sleeve is completely adhered or integral with and free from slippage with respect to the base core.

Generally where the elastic material of the cover 14 and tube 22 of the protective sleeve are of like material, mutual adherence will be provided between the materials after heat setting or co-curing the articles which prior to curing are in a raw or green state, as hereafter described. However, when the materials forming the core cover 14 and tube 22 are incompatible in the sense that co-curing does not produce a cross linking reaction or other mutual adherence, then a tie gum (not shown) may be interposed as an added layer between the cover 14 and tube 22 which will bond to each of such members, respectively, forming an integral and unitary composite free from mutual slippage. In this latter respect, the tie gum layer will also be of a heat setting elastomeric material of sufficient thickness to possess independent structural integrity, as distinguished from a thin coating of adhesive or cement. In addition, the tie gum will be cured-in-place together with tube 22 and cover 14.

Additionally, if the materials of the base tube and protective sleeve are not normally bondable together upon simply curing or vulcanizing, a bonding agent may be compounded into either or both of the elements to enable a permanent attachment upon co-vulcanization.

While both the inner core and outer protective sleeve have been illustrated as cylindrical in configuration, certainly this is not necessary and various geometrical shapes may be envisioned without departing from the function and operation of the protective sleeve of the invention. In general, the protective sleeve will have an average wall thickness (in the area to be protected) preferably of at least about 20% and more preferably of at least about 30% and most preferably of at least about 60% of the average wall thickness of the inner core. Normally the annular wall thickness of the protective sleeve 10 should be adequate to endure the hazard encountered for the period of time required by the user, providing sufficient resistance to abrasion, thermal or chemical influences for safety and extended product service life.

Figure 2:
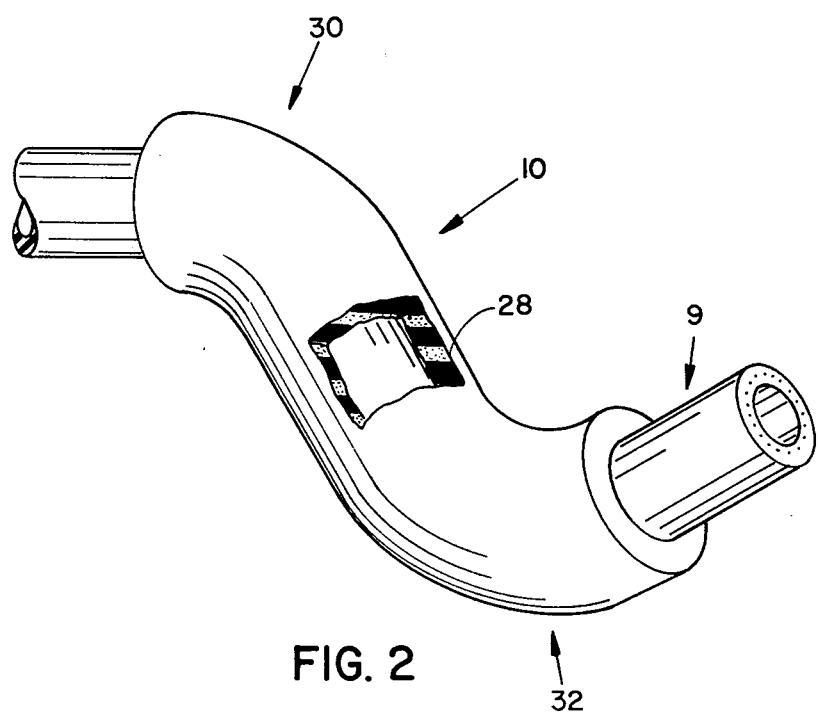
FIG. 2 depicts in partial cutaway an alternative form of protected sleeve for the composite article of the invention.

An alternative embodiment is shown in FIG. 2 in which the tubular protective sleeve 10 is unreinforced and formed of a foamed elastomeric annular member 28. In this embodiment, the hose core 9 is a curved element having multiple bends at 30 and 32, with the sleeve 10 at least partially covering the bend 30 for rendering protection to the outside of the bend of the core hose. A typical example of this type of curved hose is used as an automotive radiator coolant hose which, because of the compactness of the engine compartment area, requires the protective sleeve 10 to guard against abrasion of the hose normally coming into contact with engine components. The foamed cover 28 has been found to be quite resistant to abrasion under these circumstances although nonfoamed sleeves may also be employed advantageously.

Various methods may be employed to produce the composite elements of FIGS. 1 and 2. In a preferred embodiment which has been found to be suitable in practice, first an elongated tube of at least partially uncured rubber or other heat setting elastomeric material is extruded, preferably reinforcement applied onto the outer surface of the tube so designed to meet the particular burst pressure involved, and a cover extruded over the reinforced tube to form an uncured hose element. At the desired position along the length of the tube, the protective sleeve or envelope is applied. In one embodiment, the elastomeric sleeve may be preformed, such as by extrusion, and then installed over the hose core and moved into position. In this embodiment, the internal diameter of the at least partially uncured elastomeric sleeve is preferably about the same as the outside diameter of the cover of the flexible core hose, or somewhat larger. After the sleeve has been properly positioned along the length of the hose, the combined element is then loaded onto a mandrel providing internal support whose outer diameter is greater than the inner diameter of the core of the hose by at least the amount by which the internal diameter of the sleeve exceeds the outer diameter of the hose core. In this manner, as the composite element is loaded onto the mandrel the inner hose is expanded outwardly and in turn applies pressure radially outwardly against the protective sleeve so that they are in intimate mutual contact. At this point the composite (positioned on the mandrel) may be subjected to a conventional curing operation in an open steam autoclave, for instance, in which heat and pressure are applied to co-vulcanize the hose and protective sleeve in place into a unitary cross-linked body. Rather than employing a solid mandrel, alternatively other types of internal support within the element may be used, such as fluid pressure.

Alternatively, the protective sleeve may be applied to the green hose core as a web or layer or layers of rubber or other desired elastomeric or reinforcement material wrapped or spiralled about the surface of the core hose at the desired position. The layer or layers of protective sleeve material are then held in place against the green hose and the composite element co-cured as the materials become plastic and flow together. The sleeve may be pressed against the core during vulcanizing or heat setting by conventional means including the use of stitching bands or wrapped with nylon cure tape, and the like.

Various other types of curing techniques may be employed without departing from the scope of the invention. For instance, the at least partially uncured or unset composite may be cured by blow molding against an externally provided mold surface of desired configuration.

In the embodiment of FIG. 2, a green, preformed tubular core 9 may be formed in the manner specified above, and then an annular layer or sleeve of elastomeric material containing a blowing agent applied to the outer surface of the preformed hose at the desired location. Any type of blowing agent compatible with the elastomeric materials may be employed, including such materials as azodicarbonamides, ammonium bicarbonate, and ureas. Upon co-vulcanization of the preformed tube and outer elastomeric sleeve, the foaming reaction takes place and the resultant composite of FIG. 2 is produced with the outer foamed sleeve intimately bonded to the inner core along at least a major portion of their mutual interface.

A variety of modifications and variations will become apparent to those skilled in the art upon a reading of this specification, and are intended to be included within the present invention as defined by the claims appended hereto.

What is claimed is:

1. A method for forming a flexible curved tubular unitary article having a protective sleeve integral therewith, comprising:

forming an elongated tube defined by respective inner and outer surfaces and comprised of elastomeric material in an uncured state;

forming an elastomeric sleeve, separate of the tube, in an uncured state and shorter in length than the tube;

positioning the sleeve upon the outer surface of the tube at a desired location spaced from each end of the tube while each of the tube and sleeve are uncured;

said sleeve at said desired location defining the radial outermost portion of the hose;

applying radially outwardly directed pressure to the inner surface of the tube from internally within the tube to force the tube outwardly and apply pressure against the sleeve; and thereafter curing the tube and sleeve together to form the curved unitary article whereby the tube and sleeve are integrally attached together and free from mutual slippage said outwardly directed pressure being supplied by positioning the tube and sleeve over a rigid curved mandrel having an outer diameter greater than the inner diameter of the tube.

2. The method of claim 1 wherein the tube and sleeve are each formed of a vulcanizable material.

3. The method of claim 1 wherein the sleeve is held tightly against the tube during curing solely as a result of the pressure developed by the mandrel acting against the tube, and without any additional means binding the sleeve to the tube.

4. The method of claim 1 wherein the sleeve normally has an inner diameter greater than the outer diameter of the tube, and wherein the outer diameter of the mandrel is greater than the inner diameter of the tube by at least the amount the inner diameter of the sleeve normally exceeds the outer diameter of the tube.

5. The method of claim 4 wherein the tube and sleeve are cured by subjecting them to heat and direct steam pressure in an open steam autoclave.

6. A method for forming a flexible curved tubular article having an intermediately positioned outer protective sleeve intimately bonded thereto, defining a unitized composite article, comprising:

forming an elongated cylindrical member having an outer surface defined by an outer diameter and comprised of a vulcanizable elastomeric material in at least a partially uncured state;

forming separately from the cylindrical member a vulcanizable elastomeric sleeve in at least a partially uncured state and substantially shorter in length than the cylindrical member, said sleeve having an inner diameter which is greater than the outer diameter of the cylindrical member;

positioning the sleeve over the outer surface of the cylindrical member to a desired intermediate position spaced from each end of the cylindrical member while each of the cylindrical member and sleeve are in their at least partially uncured states;

installing the cylindrical member and sleeve over a rigid curved mandrel of such dimension to cause the cylindrical member to expand radially and press against the sleeve and establish intimate contact therebetween; and applying heat and mutual pressure to co-vulcanize said cylindrical member and said sleeve while installed on the mandrel whereby the cylindrical member and sleeve become intimately bonded along their outer and inner surfaces, respectively, to form the unitized curved composite article.

7. The method of claim 6 wherein the sleeve is preformed of a tube containing a blowing agent, and whereby said co-vulcanization step of applying heat and pressure results in a foaming reaction of the blowing agent to produce a sleeve of foamed elastomer.

8. A method for forming a curved hose having at least one bend portion and having a protective sleeve positioned intermediate the ends of the hose, comprising:

extruding an elongated vulcanizable rubber seamless tube of uncured rubber;

twining a reinforcement about the outer surface of the tube;

extruding a cover of uncured rubber over the reinforced tube, thereby defining an uncured hose element of a given inside and outside diameter;

preforming an extruded uncured seamless rubber sleeve of substantially lesser length than the hose element, and having an inner diameter somewhat larger than the outside diameter of the uncured hose element;

installing the sleeve over the uncured hose element and moving the sleeve to the desired position so that the sleeve is spaced from both ends of the uncured hose element;

loading the combined uncured hose element and sleeve onto a rigid mandrel of curvature corresponding to the desired curvature of the finished hose, the mandrel having an outer diameter greater than the inside diameter of the uncured hose element by at least the amount by which the inner diameter of the sleeve exceeds the outside diameter of the uncured hose element, thereby expanding the uncured hose element radially outwardly against the sleeve; and thereafter applying direct heat and pressure from a steam atmosphere source to co-vulcanize the uncured hose element and sleeve to form a unitized, reinforced curved hose composite.

9. The method of claim 8 including the step of positioning the protective sleeve directly over a bend portion of the curved hose.

10. The method of claim 8 further comprising the step of embedding a reinforcement in the sleeve.

* * * * *